(12) United States Patent
Kwon et al.

(10) Patent No.: US 9,691,015 B2
(45) Date of Patent: Jun. 27, 2017

(54) MEMORY CARD ADAPTER AND MEMORY APPARATUS

(71) Applicant: Samsung Electronics Co., Ltd., Suwon-si, Gyeonggi-do (KR)

(72) Inventors: Seok-Cheon Kwon, Yongin-si (KR); Jae-Bum Lee, Yongin-si (KR); Seok-Heon Lee, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/157,507

(22) Filed: May 18, 2016

(65) Prior Publication Data

US 2017/0053199 A1    Feb. 23, 2017

(30) Foreign Application Priority Data

Aug. 20, 2015   (KR) .................. 10-2015-0117248

(51) Int. Cl.
    *G06K 19/06*    (2006.01)
    *G06K 19/077*   (2006.01)

(52) U.S. Cl.
    CPC .  *G06K 19/07732* (2013.01); *G06K 19/07741* (2013.01)

(58) Field of Classification Search
    CPC ....... G06K 19/07732; G06K 19/07739; G06K 19/07741
    USPC ................................... 235/441, 492
    See application file for complete search history.

(56) References Cited

U.S. PATENT DOCUMENTS

| | | | |
|---|---|---|---|
| 6,438,638 B1 * | 8/2002 | Jones .................... | G06F 13/38 710/301 |
| 6,746,280 B1 * | 6/2004 | Lu ......................... | H01R 24/00 361/737 |
| 6,915,956 B2 | 7/2005 | Liu et al. | |
| 7,070,453 B1 * | 7/2006 | Chen ..................... | H01R 27/00 439/159 |
| 7,097,510 B1 * | 8/2006 | Chen .................... | H01R 13/193 439/630 |
| 7,104,809 B1 * | 9/2006 | Huang ................. | G06K 19/077 439/142 |
| 7,104,846 B1 * | 9/2006 | Yen ...................... | G06K 7/0043 439/630 |

(Continued)

FOREIGN PATENT DOCUMENTS

KR    10-1424229 B1    7/2014

*Primary Examiner* — Paultep Savusdiphol
(74) *Attorney, Agent, or Firm* — Harness, Dickey & Pierce, P.L.C.

(57) ABSTRACT

Memory card adapters and/or a memory apparatuses may be provided. For example, a memory card adapter including a main housing section that corresponds to a memory card socket of a first standard, the main housing section including a card housing section, the card housing section configured to house a memory card of a second standard different from the first standard therein, a first surface of the main housing section defining a through-hole, the through-hole configured to expose a connection pin of the memory card to be housed in the housing section to an outside of the housing section, and a second surface of the main housing section defining a card insertion hole, the second surface being different from the first surface, the card insertion hole configured to receive the memory card into the card housing section may be provided.

20 Claims, 14 Drawing Sheets

(56) References Cited

U.S. PATENT DOCUMENTS

| | | | |
|---|---|---|---|
| 7,172,464 B1* | 2/2007 | Lee | H01R 27/00 439/159 |
| 7,233,058 B2 | 6/2007 | Wada et al. | |
| 8,337,239 B2 | 12/2012 | Holmes | |
| 8,597,058 B2 | 12/2013 | Lin et al. | |
| 8,654,535 B2 | 2/2014 | Lin et al. | |
| 2002/0032813 A1* | 3/2002 | Hosaka | G06K 19/077 710/62 |
| 2003/0084221 A1* | 5/2003 | Jones | G06F 13/38 710/302 |
| 2003/0093606 A1* | 5/2003 | Mambakkam | G06F 13/385 710/305 |
| 2003/0109179 A1* | 6/2003 | Kaneshiro | G06K 7/0021 439/638 |
| 2004/0050934 A1* | 3/2004 | Chen | G06K 19/07741 235/441 |
| 2004/0056094 A1* | 3/2004 | Liu | G06K 19/07732 235/441 |
| 2004/0167997 A1* | 8/2004 | Ikeda | G06F 1/183 710/15 |
| 2004/0184246 A1* | 9/2004 | Le | G06K 19/07741 361/764 |
| 2005/0037647 A1* | 2/2005 | Le | G06K 19/07732 439/131 |
| 2005/0258243 A1* | 11/2005 | Hsieh | G06K 7/0047 235/441 |
| 2005/0280131 A1* | 12/2005 | Wada | G06K 19/077 257/679 |
| 2006/0133051 A1* | 6/2006 | Calvas | G06K 19/07741 361/752 |
| 2006/0205258 A1* | 9/2006 | Cho | H01R 13/2442 439/326 |
| 2007/0019389 A1* | 1/2007 | Du | G06F 1/1616 361/728 |
| 2007/0077822 A1* | 4/2007 | Tanaka | G06K 19/07735 439/630 |
| 2007/0134987 A1* | 6/2007 | Yen | H01R 13/7032 439/630 |
| 2007/0162676 A1* | 7/2007 | Hsu | G06F 13/385 710/301 |
| 2007/0274033 A1* | 11/2007 | Hwang | G06F 1/186 361/679.32 |
| 2008/0166920 A1* | 7/2008 | Johnson | G06K 19/07732 439/638 |
| 2011/0003513 A1* | 1/2011 | Matsumoto | H01R 31/06 439/628 |
| 2013/0311720 A1 | 11/2013 | Li et al. | |
| 2014/0127947 A1 | 5/2014 | Han | |
| 2014/0198460 A1 | 7/2014 | Chuang et al. | |
| 2014/0315399 A1 | 10/2014 | Bosquet | |

* cited by examiner

1200

1300

1400

MEMORY CARD ADAPTER AND MEMORY APPARATUS

This application claims under 35 U.S.C. §119 priority to Korean Patent Application No. 10-2015-0117248, filed on Aug. 20, 2015, in the Korean Intellectual Property Office, the disclosure of which is incorporated herein by reference in its entirety.

BACKGROUND

1. Field

The present inventive concepts relate to memory card adapters and memory apparatuses.

2. Description of the Related Art

External memory cards are easy to carry and support multiple standards. For example, the memory card may be manufactured as a full-size memory card or as a mini-size memory card having a smaller size than the full-size memory card, depending on the application. A host device equipped with a memory card socket may send and receive a data to and from the memory card inserted into the memory card socket. However, the memory card socket may vary depending on the host device. In order to use the same memory card (e.g., a mini-size memory card) between multiple host devices respectively equipped with the memory card sockets having different standards (e.g., in terms of form factor and/or supporting operation speed), techniques that enable the mini-size memory card to be inserted into the memory card socket to which the full-size memory card is inserted is desired.

SUMMARY

An aspect of the present inventive concepts provides a memory card adapter for using a memory card compliant with a first standard in a memory card socket compliant with a second standard different from the first standard.

Another aspect of the present inventive concepts provides a memory apparatus for using a memory card compliant with a first standard in a memory card socket compliant with a second standard different from the first standard.

Aspects of the present inventive concepts are not restricted to those set forth herein. Other aspects that have not been mentioned will become more apparent to one of ordinary skill in the art to which the present inventive concept pertains from the following description.

According to an example embodiment, a memory card adapter includes a main housing section that corresponds to a memory card socket of a first standard, the main housing section including a card housing section, the card housing section configured to house a memory card of a second standard different from the first standard therein, a first surface of the main housing section defining a through-hole, the through-hole configured to expose a connection pin of the memory card to be housed in the housing section to an outside of the housing section, and a second surface of the main housing section defining a card insertion hole, the second surface being different from the first surface, the card insertion hole configured to receive the memory card into the card housing section.

According to an example embodiment, a memory card adapter includes a main housing section including a card housing section, the card housing section configured to receive a memory card inserted into one side surface of the main housing section, an upper surface of the main housing section defining a through-hole, the through-hole configured to expose a connection pin of the memory card therethrough. A distance between the upper surface of the main housing section and the card housing section may be less than a distance between a lower surface of the main housing section and the card housing section.

According to an example embodiment, a memory card adapter includes a main housing section that corresponds to a memory card socket of a first standard, the main housing section including a card housing section, the card housing section configured to house a memory card of a second standard different from the first standard therein, an upper surface of the main housing section defining a through-hole and a card insertion hole, the through-hole configured to expose a connection pin of the memory card therethrough, and the card insertion hole configured to receive the memory card into the card housing section.

According to an example embodiment, a memory apparatus includes a memory card including a plurality of connection pins on one surface thereof, and a memory card adapter configured to house the memory card through one of an upper surface and a side surface thereof, the memory card adapter including a through-hole, the through hole configured to expose the plurality of connection pins of the memory card therethrough.

According to an example embodiment, a memory card adapter being compliant with a memory card socket having a first form factor includes a card housing section configured to house a memory card, the memory card having a second form factor, the second form factor smaller than the first form factor, the memory card including a card connection pin, the card connection pin compliant with a first standard, a first surface of the memory card adapter defining a card insertion hole, the card insertion hole configured to receive the memory card into the card housing section, and a second surface of the memory card adapter defining a through-hole, the through-hole exposing the card connection pin of the memory card.

BRIEF DESCRIPTION OF THE DRAWINGS

The above and other aspects and features of the present inventive concepts will become more apparent by describing in detail some example embodiments thereof with reference to the attached drawings, in which.

DETAILED DESCRIPTION

Figure 1:
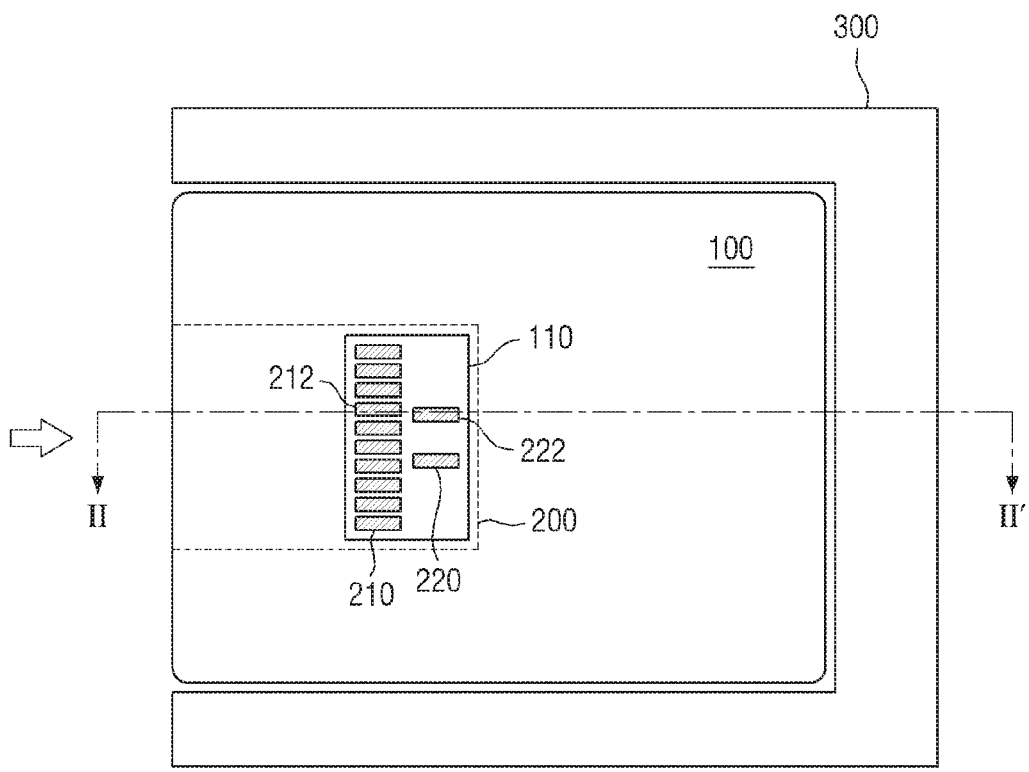
FIG. 1 is a schematic diagram for illustrating a memory card adapter according to an example embodiment of the present inventive concepts.

Various example embodiments will be described in detail with reference to the accompanying drawings. The inventive concepts, however, may be embodied in various different forms, and should not be construed as being limited only to the illustrated example embodiments. Rather, these example embodiments are provided as examples so that this disclosure will be thorough and complete, and will fully convey the scope of the inventive concepts to those skilled in the art. Accordingly, known processes, elements, and techniques are not described with respect to some of the example embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of example embodiments. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Expressions such as "at least one of," when preceding a list of elements, modify the entire list of elements and do not modify the individual elements of the list.

Hereinafter, some example embodiments of the present inventive concepts will be described with reference to the attached drawings.

Figure 2A:
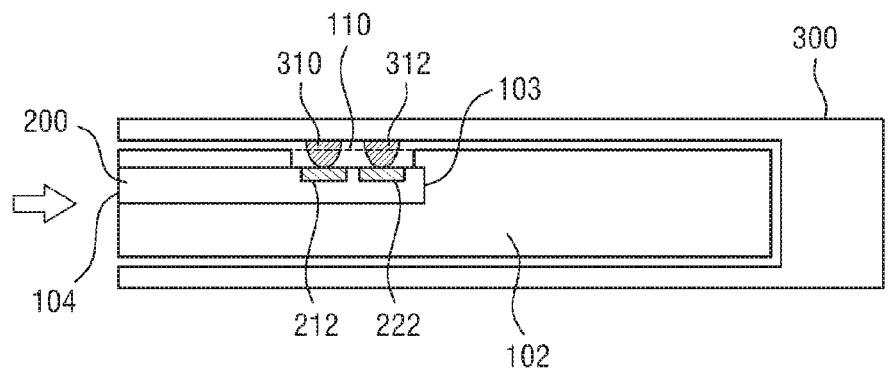
FIG. 2A a diagram illustrating a cross-section taken along line in the example embodiment illustrated in FIG. 1.
Figure 2B:
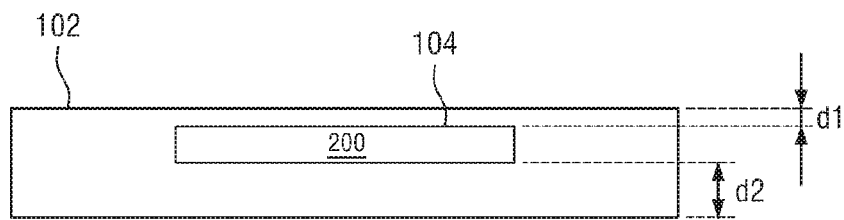
FIG. 2B is a diagram illustrating one side surface of the memory card adapter according to an example embodiment of the present inventive concepts.

FIG. 1 is a schematic diagram for illustrating a memory card adapter according to an example embodiment of the present inventive concepts, FIG. 2A a diagram illustrating a cross-section taken along line II-II' in the example embodiment illustrated in FIG. 1, and FIG. 2B is a diagram illustrating one side surface of the memory card adapter according to an example embodiment of the present inventive concepts.

Referring to FIGS. 1 and 2A, a memory card adapter 100 may include a housing section 102, a through-hole 110 and a card insertion hole 104.

The memory card adapter 100 may house a memory card 200 therein and may be inserted into the memory card socket 300. Here, the memory card socket 300, for example, may correspond to a first standard to allow the insertion of the memory card compliant with the first standard, and be mounted on a host device that accesses the memory card 200. The memory card 200 may comply with a second standard different from the first standard. For example, the memory card socket 300, for example, may be manufactured for a full size memory card (e.g., Multimedia card) of 24 mm×32 min, and the memory card 200, for example, may be a mini size memory card (e.g., microSD card) of 11 mm×15 mm. That is, the memory card adapter 100 may allow the memory card 200 (e.g., Universal Flash Storage (UFS) Card) having the external size compliant with the second standard to be used in the memory card socket 300 (e.g., SD card) compliant with the first standard. In some example embodiments of the present inventive concepts, the memory card adapter 100 may be manufactured of an insulating material (e.g., plastic).

In some example embodiments of the present inventive concepts, the memory card 200 may be a memory card that operates using a high-speed interface. For example, the memory card 200 may operate using at least one of a universal flash storage (UFS) interface, an ultra-high speed class 1 (UHS-1) interface and an ultra-high speed class 2 (LTHS-2) interfaces, but the scope of the present inventive concepts is not limited thereto. Meanwhile, in some example embodiments of the present inventive concepts, the memory card 20 may include at least one of a secure digital (SD) card, a micro SD card, a multimedia card (MMC), a universal flash storage (UFS) card, a memory stick (MS), and an extreme digital (xD) card. Meanwhile, in some example embodiments of the present inventive concepts, the memory card 200 may include a plurality of connection pins that is formed on one surface in plural rows. For example, the memory card 200 may include a plurality of connection pins 210, 212, 220, 222 that are formed on one surface in two rows.

The housing section 102 may correspond to the memory card socket 300, and include a card housing section 103 that houses the memory card 200 therein. That is, the housing section 102 may correspond to the memory card socket 300 compliant with the first standard, and the internal card housing section 103 may house the memory card 200 compliant with the second standard different from the first standard.

The through-hole 110 may be formed on a first surface of the housing section 102, and expose the connection pins 210, 212, 220, 222 of the memory card 200 housed in the housing section 102 to the outside of the housing section 102. Here, the first surface of the housing section 102, for example, may correspond to the upper surface or the lower surface of the housing section 102, with respect to the ground. In this specification, for the convenience of explanation, the through-hole 110 may be formed on an upper surface of the housing section 102. In some example embodiments, the through-hole 110 may also be formed on a lower surface of the housing section 102.

When the memory card adapter 100 with the memory card 200 inserted thereto is inserted to the memory card socket 300, the through-hole 110 of the card adapter 100 may house a part of the connection pins 310, 312 of the memory card socket 300 therein. That is, the connection pins 310, 312 of the memory card socket 300 may be partially disposed inside the through-hole 110. The connection pins 212, 222 of the memory card 200 exposed by the through-hole 110 may form a direct-contact (e.g., a direct physical contact) with the connection pins 310, 312 of the memory card socket 300. For example, when the memory card socket 300 having a first form factor receives the memory card adapter 100 including the memory card 200 having a second form factor, The connection pins 212, 222 of the memory card 200 exposed by the through-hole 110 may form a direct-contact (e.g., a direct physical contact) with the connection pins 310, 312 of the memory card socket 300. Both the connection pins 212, 222 of the memory card 200 and the connection pins 310, 312 of the memory card socket 300 may be compliant with a first data transfer rate.

As described above, the memory card 200 compliant with the second standard may operate using a high-speed interface. For example, when the memory card 200 operates using a UFS interface, a data rate may range from approximately 1.5 Gbps to approximately 6 Gbps, or may reach approximately 12 Gbps. In view of the operating characteristics of the memory card 200, the memory card adapter 100, which can accommodate memory cards compliant with different external standards between the memory card socket 300 and the memory cards 200, may provide a direct electrical connection (e.g., a direct physical contact) between the connection pins 310, 312 of the memory card socket 300 and the connection pins 212, 222 of the memory card 200, using the through-hole 110.

The card insertion hole 104 may be formed on a second surface of the housing section 102, for example, on one side surface of the housing section 102 to insert the memory card 200 into the housing section 102. For example, the card insertion hole 104 may be disposed to be deflected toward an upper surface of the housing section 102 so as to provide a direct electrical connection (e.g., a direct physical contact) between the connection pins 212, 222 of the memory card 200 and the connection pins 310, 312 of the memory card socket 300 described above in connection with the through-hole 110. Referring to FIG. 2B, on one side surface of the housing section 102, a distance d1 between the upper surface of the housing section 102 and the card insertion hole 104 may be shorter than a distance d2 between a lower surface of the housing section 102 and the card insertion hole 104.

In other words, the distance between the upper surface of the housing section 102 and the card housing section 103 may be shorter than the distance between the lower surface of the housing section 102 and the card housing section 103. Meanwhile, when the memory card adapter 200 with the memory card 100 inserted thereto is inserted into the memory card socket 300, the distance between the upper surface of the memory card adapter 100 and the upper surface of the memory card 200 housed in the memory card adapter 100 may be shorter than the distance between the lower surface of the memory card adapter 100 and the lower surface of the memory card 200 housed in the memory card adapter 100.

Figure 3A:
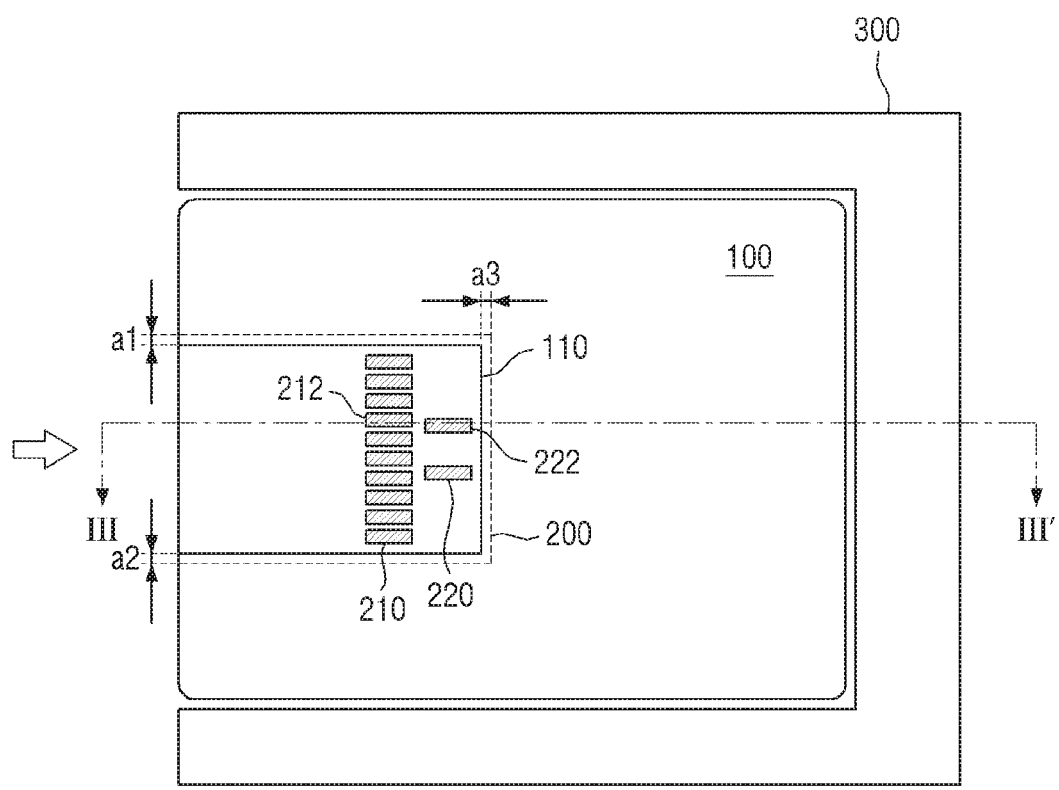
FIG. 3A is a schematic diagram for illustrating a memory card adapter according to another example embodiment of the present inventive concepts.
Figure 3B:
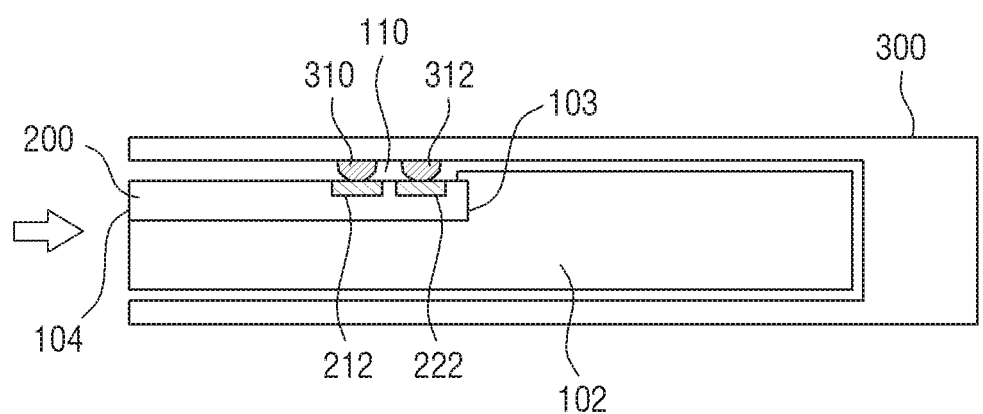
FIG. 3B is a diagram illustrating a cross-section taken along line III-III' in the example embodiment illustrated in FIG. 3A.
Figure 3C:
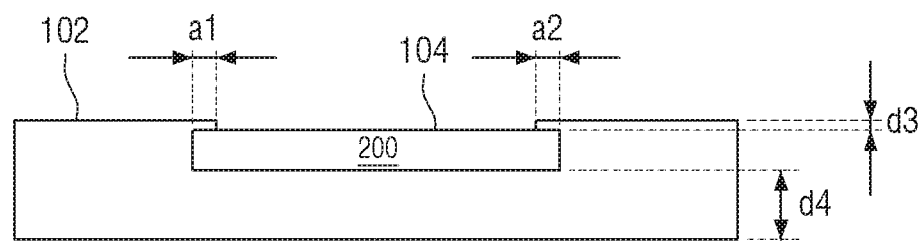
FIG. 3C is a diagram illustrating one side surface of a memory card adapter according to an example embodiment of the present inventive concepts.

FIG. 3A is a schematic diagram for illustrating a memory card adapter according to an example embodiment of the present inventive concepts, FIG. 3B is a diagram illustrating a cross-section taken along line III-III' in the example embodiment illustrated in FIG. 3A, and FIG. 3C is a diagram illustrating one side surface of a memory card adapter according to an example embodiment of the present inventive concepts.

Referring to FIGS. 3A to 3B, these example embodiments are different from the example embodiments of FIGS. 1, 2A and 2B in that a through-hole 110 is formed to extend to one side of the memory card adapter 100 such that the memory card 200 is located close to the upper surface of the card adapter 100 as much as possible. As the through-hole 110 is formed to extend to one side of the memory card adapter 100, a portion of the card adapter 100 may be used to secure the memory card 200. For example, as illustrated in FIG. 3A, the card adapter 100 may be formed to partially protrude or extend over the memory card 200 by thicknesses a1, a2, a3. A thickness d3 of the protrusion (i.e., a distance between the upper surface of the housing section 102 and the memory card 200) may be less than a thickness d4 of the protrusion (i.e., a distance between the lower surface of the housing section 102 and the memory card 200).

Figure 4:
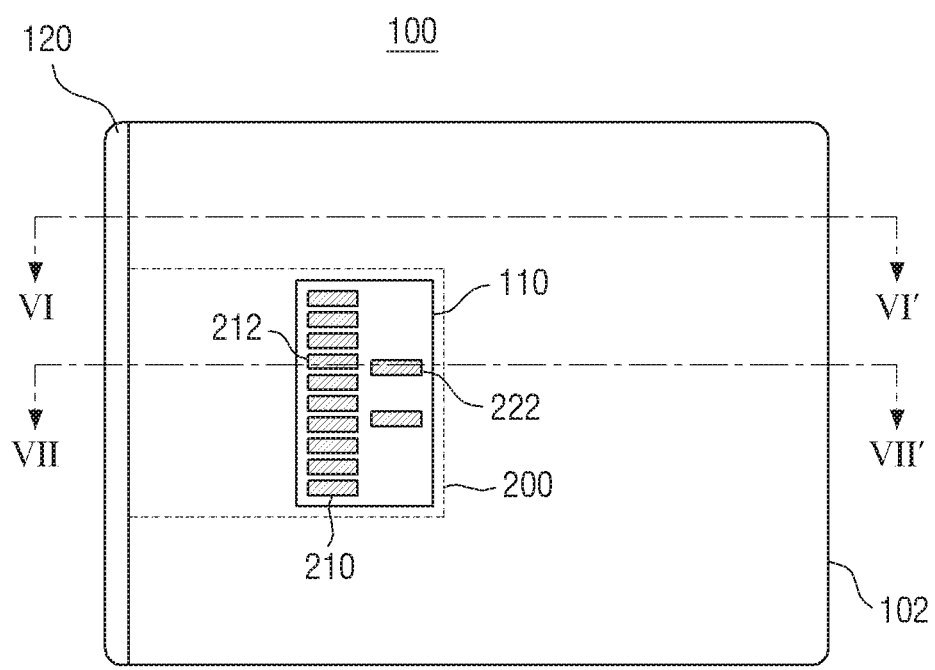
FIGS. 4 and 5 are schematic diagrams for illustrating a memory card adapter according to some example embodiments of the present inventive concepts.
Figure 5:
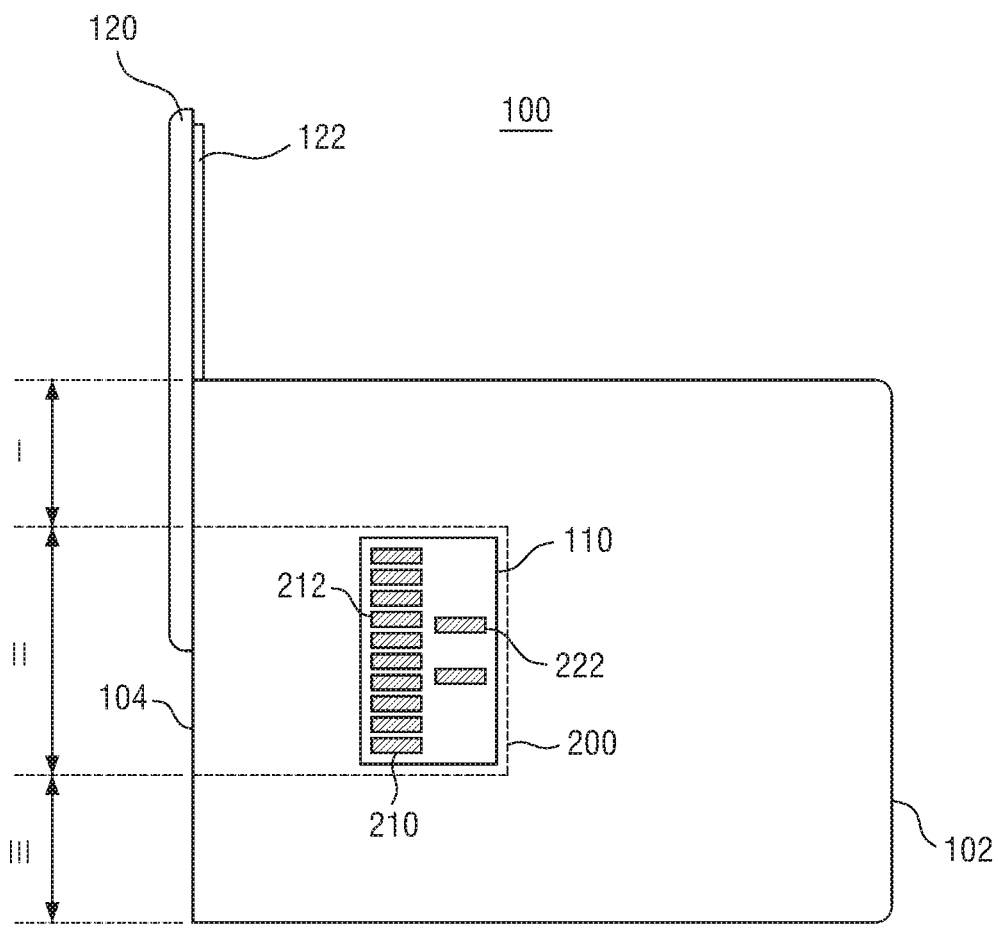
Figure 6:
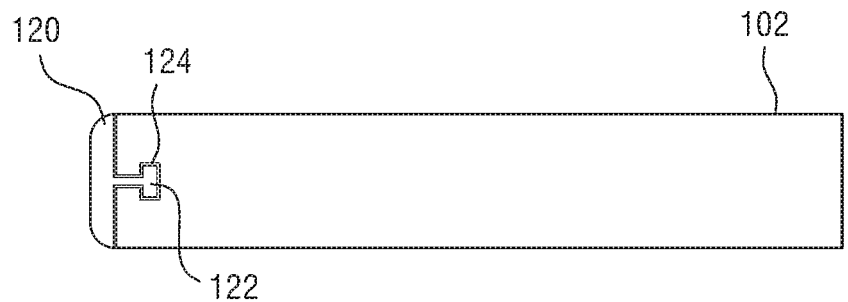
FIG. 6 is a diagram illustrating a cross-section taken along line VI-VI' of the example embodiment illustrated in FIG. 4.
Figure 7:
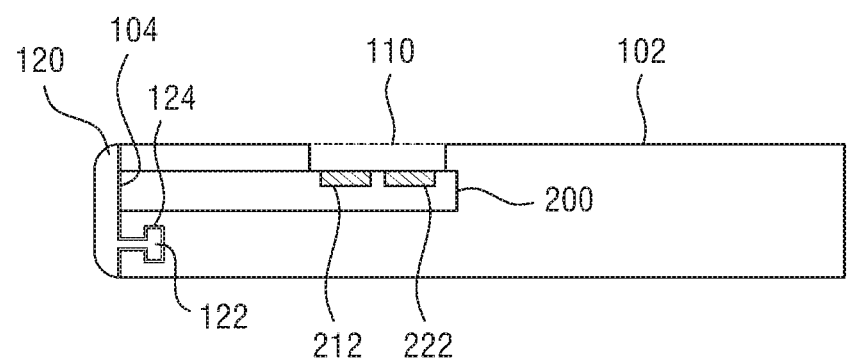
FIG. 7 is a diagram illustrating a modified example of the example embodiment illustrated in FIG. 6.

FIGS. 4 and 5 are schematic diagrams for illustrating a memory card adapter according to some example embodiments of the present inventive concepts, FIG. 6 is a diagram illustrating a cross-section taken along line VI-VI' in the example embodiment illustrated in FIG. 4, and FIG. 7 is a diagram illustrating a modified example of the embodiment illustrated in FIG. 6 and illustrating a cross-section taken along line VII-VII' in the example embodiment illustrated in FIG. 4.

Referring to FIG. 4, this example embodiment is different from the example embodiment of FIG. 1 in that a memory card adapter 100 further includes a cover 120. The cover 120 may be formed on the second surface of the memory card adapter 100 in which a card insertion hole 104 is formed, thereby opening and closing the card insertion hole 104. Thus, the cover 120 may prevent the unintentional release of the memory card 200 housed in a housing section 102.

Referring to FIGS. 5 and 6, the cover 120 may be a sliding cover that opens and closes the card insertion hole 104 in a sliding manner along the second surface of the memory card adapter 100. The cover 120 may include a cover coupling section 122 for coupling the cover 120 with the housing section 102 on its one surface (e.g., the second surface). The cover coupling section 122 may be coupled to a cover guide section 124 formed on the second surface of the housing section 102, and may guide the movement of the cover 120 (e.g., guiding the sliding cover to slide on the second surface of the housing section 102). In some example embodiments of the present inventive concepts, the cover guide section 124 may be provided on the second surface of the memory card adapter 100 over a first area I and a third area III, and may not be formed in a second area II in which the card insertion hole 104 is provided.

Referring to FIG. 7 the cover guide section 124 may be formed over the first area I to the third area III on the second surface of the memory card adapter 100 at a position vertically lower than a position of the card insertion hole 104. In such cases, the second area II on the second surface of the memory card adapter 100 may include both of the card insertion hole 104 and a part of the cover guide section 124. According to some example embodiments of the inventive concepts, the cover guide section 124 may also be formed over the first area I to the third area III on the second surface of the memory card adapter 100 at the position vertically higher than the position of the card insertion hole 104.

The shapes of the cover 120, the cover coupling section 122 and the cover guide section 124 illustrated in FIGS. 5 and 6, and the vertical positions of the cover coupling section 122 and the cover guide section 124 are only examples for the explanation of the present inventive concepts. The specific shapes of the cover 120, the cover coupling section 122 and the cover guide section 124, and the specific vertical positions of the cover coupling section 122 and the cover guide section 124 may vary depending on their applications and manufacturing environments.

Figure 8:
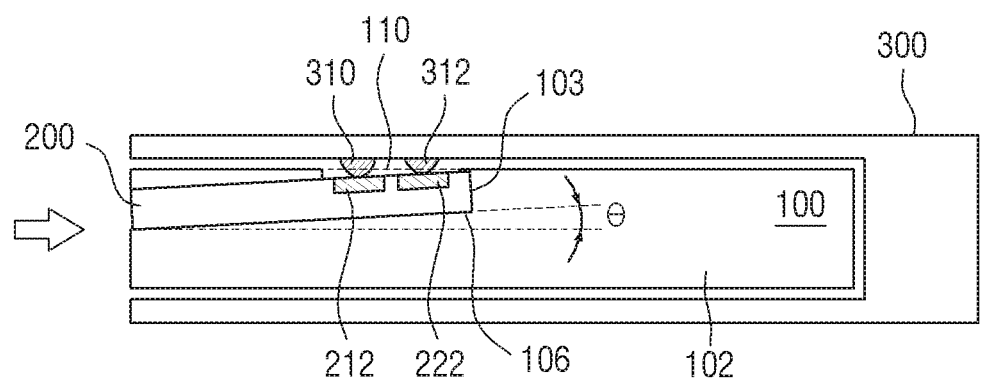
FIG. 8 is a schematic diagram for illustrating a memory card adapter according to an example embodiment of the present inventive concepts.

FIG. 8 is a schematic diagram for illustrating a memory card adapter according to an example embodiment of the present inventive concepts.

Referring to FIG. 8, a memory card adapter 100 may include an inclined card housing section 103. Thus, the card housing section 103 may allow the memory card 200 to be obliquely housed on the lower surface of a housing section 102. In some example embodiments of the present inventive concepts, a contact surface 106, on which the interior of the housing section 102 and the lower surface of the memory card 200 come into contact with each other, may be formed to form an acute angle θ with the lower surface of the housing section 102. Thus, the physical distance between connection pins 212, 222 of the memory card 200 and connection pins 310, 312 of a memory card socket 300 may be reduced, thereby enhancing the direct electrical connection.

Figure 9:
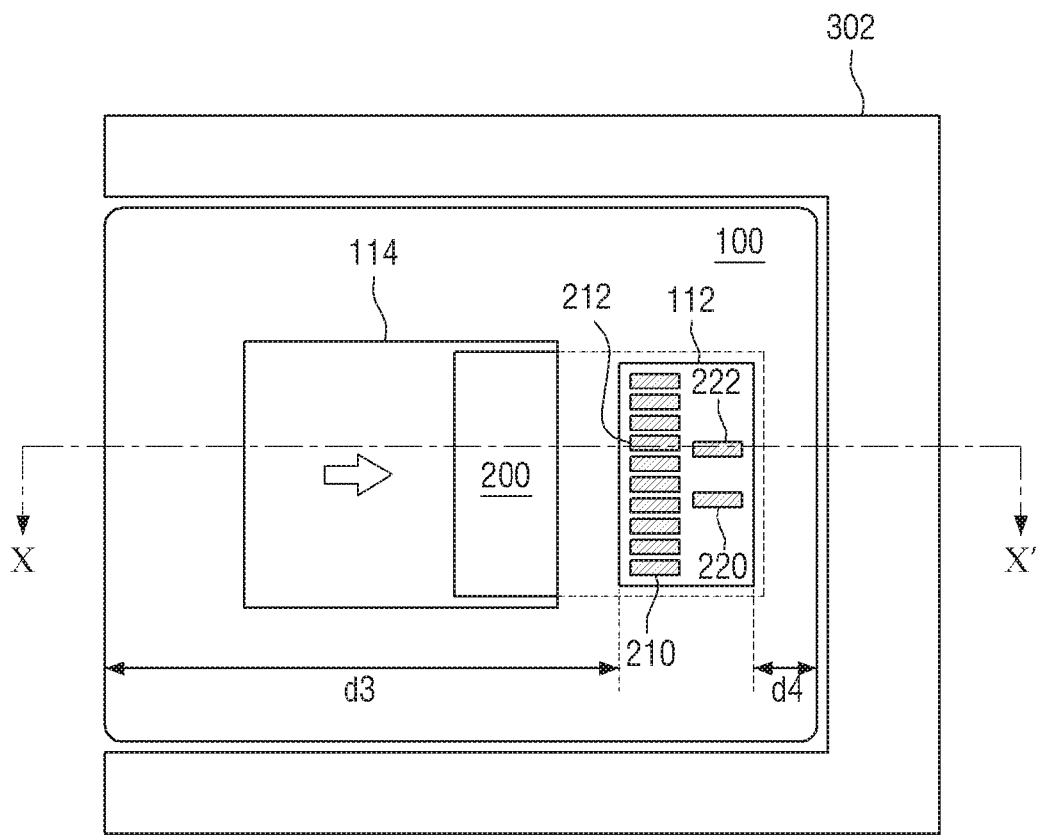
FIG. 9 is a schematic diagram for illustrating a memory card adapter according to an example embodiment of the present inventive concepts.
Figure 10:
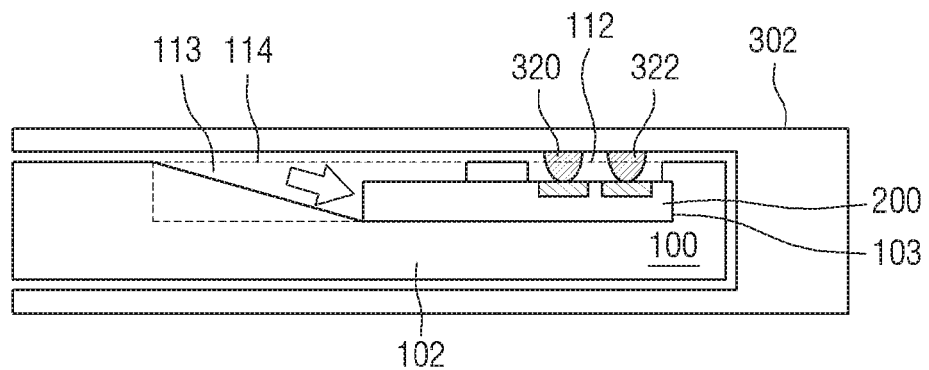
FIG. 10 is a diagram illustrating a cross-section taken along line X-X' in the example embodiment illustrated in FIG. 9.

FIG. 9 is a schematic diagram for illustrating a memory card adapter according to an example embodiment of the present inventive concepts, and FIG. 10 is a diagram illustrating a cross-section taken along line X-X' in the example embodiment illustrated in FIG. 9.

Referring to FIGS. 9 and 10, a memory card adapter 100 includes a housing section 102, a through-hole 112 and a card insertion hole 114.

The housing section 102 corresponds to a memory card socket 302, and includes a card housing section 103 that houses a memory card 200 therein. That is, the housing section 102 corresponds to a memory card socket 300 compliant with a first standard, and the internal card housing section 103 houses the memory card 200 compliant with a second standard different from the first standard.

A through-hole 112 may be formed on the upper surface of the housing section 102 to expose connection pins 210, 212, 220, 222 of the memory card 200 housed in the housing section 102 to the outside of the housing 102. In some example embodiments of the present inventive concepts, the housing section 102 may include a first long side extending in a first direction in which the memory card adapter 100 is inserted into the memory card socket 302, and a second long side spaced apart from the first long side, and includes a first short side extending in a second direction perpendicular to the first direction, and a second short side spaced apart from the first short side. A distance d3 between the first short side and the through-hole 112 may be longer than a distance d4 between the through-hole 112 and the second short side.

The card insertion hole 114 may be formed on the upper surface of the housing section 102 to insert the memory card 200 into the card housing section 103 from the upper surface of the housing section 102. In some example embodiments of the present inventive concepts, the housing section 102 may include a card insertion guide section 113 such that the memory card 200 can be inserted through the card insertion hole 114 in a sliding manner. Here, the card insertion guide section 113 may have an inclined shape such that the memory card 200 can be obliquely inserted through the card insertion hole 114. Meanwhile, in some example embodiments of the present inventive concepts, the card insertion hole 114 may be formed between the first short side and the through-hole 112.

Figure 11:
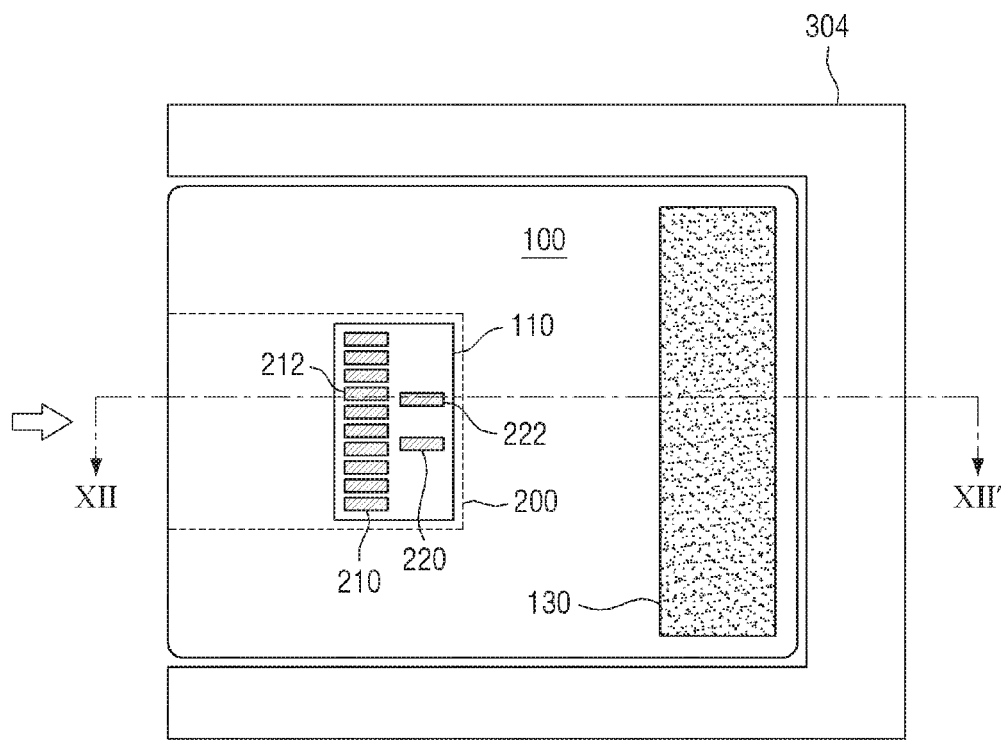
FIG. 11 is a schematic diagram for illustrating a memory card adapter according to an example embodiment of the present inventive concepts.
Figure 12:
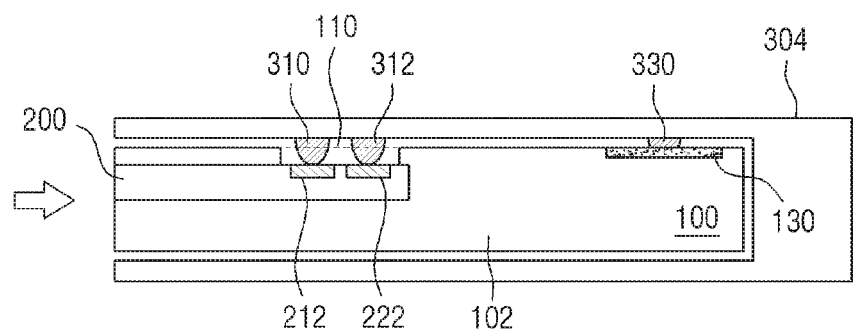
FIG. 12 is a diagram illustrating a cross-section taken along line in the example embodiment illustrated in FIG. 11.

FIG. 11 is a schematic diagram for illustrating a memory card adapter according to an example embodiment of the present inventive concepts, and FIG. 12 is a diagram illustrating a cross-section taken along line XII-XII' in the example embodiment illustrated in FIG. 11.

Referring to FIGS. 11 and 12, a memory card adapter 100 may be inserted into a memory card socket 304 which includes first connection pins 310, 312 configured to transfer data through a first interface, and a second connection pin 330 configured to transfer data through a second interface different from the first interface. In this case, a through-hole 110 of the card adapter 100 may connect connection pins 210, 212, 220, 222 of the memory card. 200 housed in a housing section 102 to the first connection pins 310, 312 for the first interface of the memory card socket 304.

In some example embodiments of the present inventive concepts, the first interface corresponds to a high-speed interface, and the second interface may correspond to a low-speed interface as compared to the first interface. For example, the first interface supports a data rate of 1.5 Gbps or more, and the second interface may support a data rate lower than the first interface. Thus, in the memory card socket 304 which supports the two interface for supporting different data rates, the memory card adapter 100 may connect the connection pins 210, 212, 220, 222 (which is compliant with a first data transfer rate) of the memory card 200 housed in the housing section 102 to the first connection pins 310, 312 (which is compliant with a first data transfer rate) for the first interface of the memory card socket 304, through the through-hole 110. In this case, the second connection pin 330 for the second interface of the memory card socket 304 may be damaged by collision or friction with the memory card adapter 100, while the memory card adapter 100 is inserted into or separated from the memory card socket 304.

In order to avoid this problem, the memory card adapter 100 according to this embodiment may further include an insulating coating film 130 formed at a position where the housing section 102 and the second connection pin 330 come into contact with each other on the upper surface of the housing section 102. In some example embodiments of the present inventive concepts, the insulating coating film 130 may be formed of plastic or polymer compound equivalent thereto to reduce an influence due to the friction or collision between the memory card adapter 100 and the second connection pin 330. In some example embodiments of the present inventive concepts, the insulating coating film may be formed at a location corresponding to a location for a connection pin compliant with a second data transfer rate. The connection pin compliant with the second data transfer rate may refer to the second connection pin 330 of the memory card socket 300, a connection pin (not shown) of the memory card adopter 100 that is complaint with the second data transfer rate, or both. According to some example embodiments, the insulation coating film 130 and the through-hole 110 may be provided on a same surface of the memory card adapter 100, while being spaced apart from each other.

Figure 13:
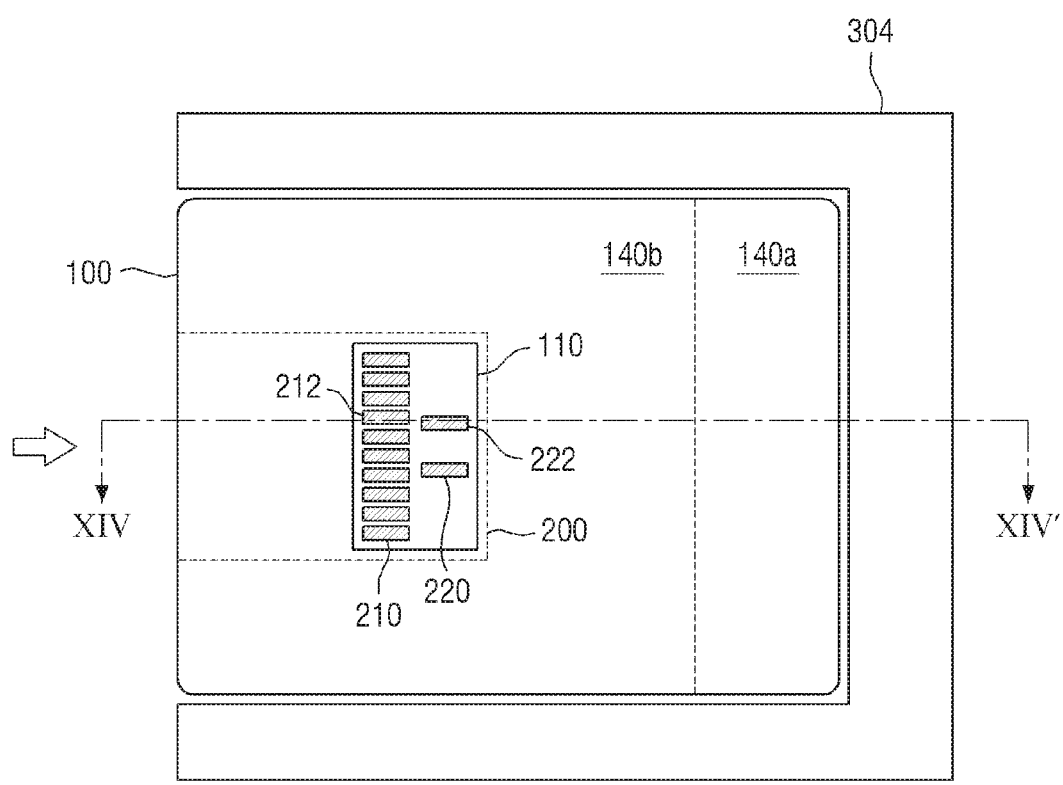
FIG. 13 is a schematic diagram for illustrating a memory card adapter according to an example embodiment of the present inventive concepts.
Figure 14:
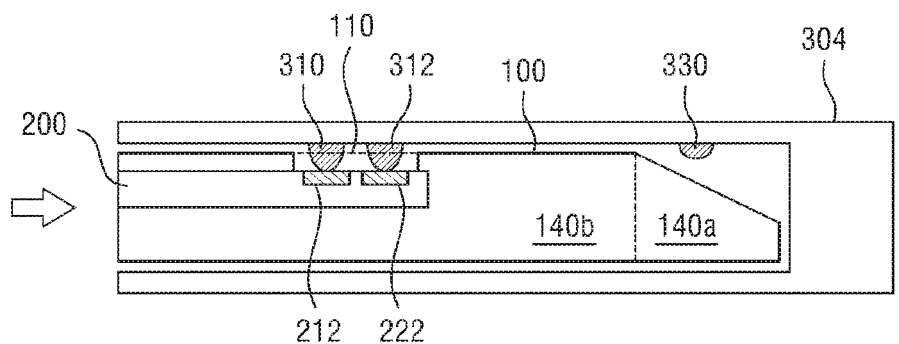
FIG. 14 is a diagram illustrating a cross-section taken along line XIV-XIV' in the example embodiment illustrated in FIG. 13.
Figure 15:
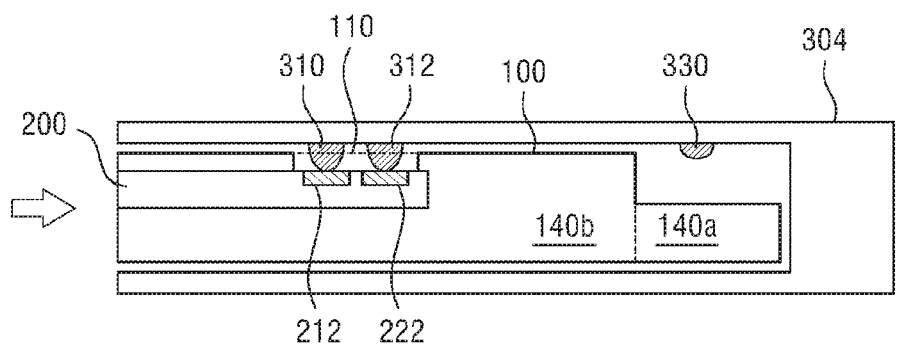
FIG. 15 is a diagram illustrating a modified example of the example embodiment illustrated in FIG. 14.

FIG. 13 is a schematic diagram for illustrating a memory card adapter according to an example embodiment of the present inventive concepts, FIG. 14 is a diagram illustrating a cross-section taken along line XIV-XIV' in the example embodiment illustrated in FIG. 13, and FIG. 15 is a diagram illustrating a modified example of the example embodiment illustrated in FIG. 14.

Referring to FIG. 13, a memory card adapter 100 may include a recess area 140a and a non-recess area 140b. As described above in connection with FIGS. 11 and 12, the second connection pin 330 for the second interface of the memory card socket 304 may be damaged by collision or friction with the memory card adapter 100 while the memory card adapter 100 is inserted into or separated from a memory card socket 304. In order to prevent or mitigate this problem, the memory card adapter 100 according to this example embodiment may include the recess area 140a which spaces the housing section 102 from the second connection pin 330 of the memory card socket 304.

In some example embodiments of the present inventive concepts, as illustrated in FIG. 14, the recess area 140a may be formed so that a corner of the housing section 102 has a chamfered shape. In some other example embodiments of the inventive concepts, as illustrated in FIG. 15, the recess area 140a may be formed to have a step from the upper surface of the non-recess area 140b. In some example embodiments of the present inventive concepts, the recessed area 140a may be formed at a location corresponding to a location for a connection pin compliant with a second data transfer rate or a second standard. The connection pin compliant with the second data transfer rate or the second standard may refer to the second connection pin 330 of the memory card socket 300, a connection pin (not shown) of the memory card adopter 100 that is complaint with the second data transfer rate or the second standard, or both. According to some example embodiments, the recess area 140a and the through-hole 110 may be spaced apart from each other.

According to various example embodiments of the present inventive concepts, a memory card socket supporting (e.g., compliant with) different standards (e.g., SD card, MicroSD Card, UFS) may house a memory card compliant with a high-speed interface (e.g., UFS) while stably maintaining data rate supported by the high-speed interface.

Figure 16:
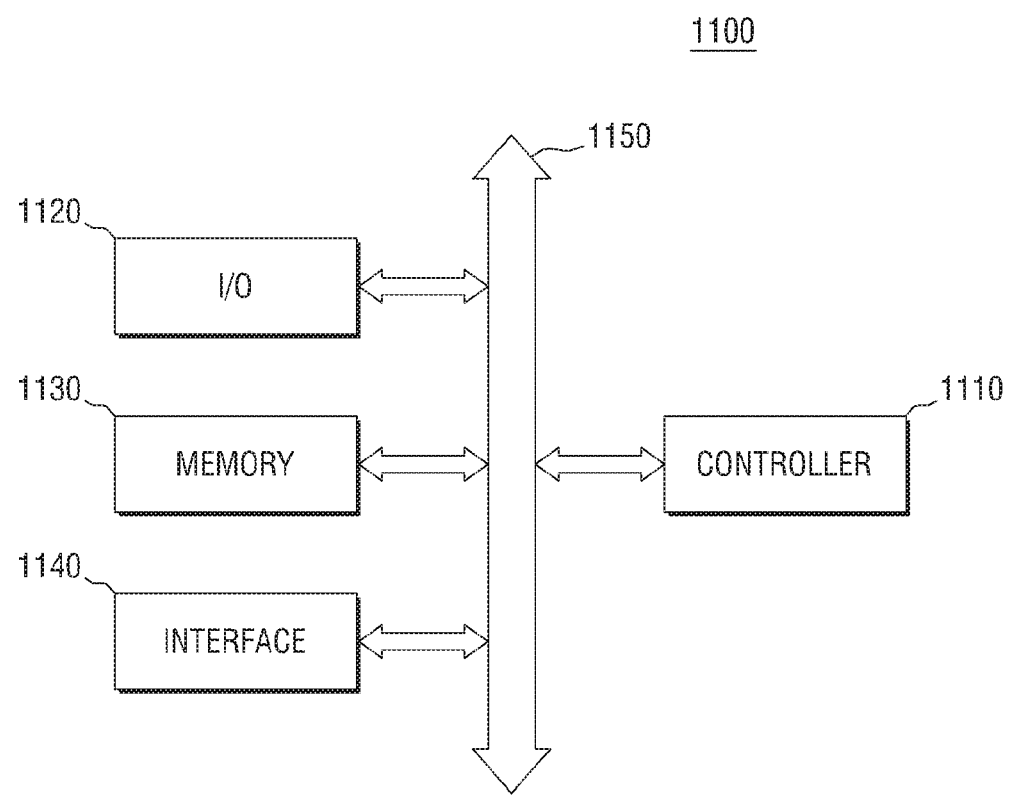
FIG. 16 is a block diagram of an electronic system including a host device that utilizes the memory card adapter according to the example embodiments of the present inventive concepts.

FIG. 16 is a block diagram of an electronic system including a host device that uses the memory card adapter according to the example embodiments of the present inventive concepts.

Referring to FIG. 16, an electronic system 1100 may include a controller 1110, an input/output (I/O) device 1120, a memory device 1130, an interface 1140, and a bus 1150. The controller 1110, the I/O device 1120, the memory device 1130 and/or the interface 1140 may be connected to one another through the bus 1150. The bus 1150 corresponds to a path through which the data are moved.

The controller 1110 may include at least one of a microprocessor, a digital signal processor, a microcontroller, and logic devices capable of performing similar functions to the elements. The I/O device 1120 may include a keypad, a keyboard and a display device. The memory device 1130 may store data and/or commands. The interface 1140 may serve to transmit data to or receive data from a communication network. The interface 1140 may be a wired or wireless interface. For example, the interface 1140 may include an antenna or a wired or wireless transceiver.

Although not shown in the drawing, the electronic system 1100 may include an operating memory for improving the operation of the controller 1110. For example, the electronic system 1100 may further include a high-speed DRAM or SRAM.

The electronic system 1100 may be applied to a personal digital assistant (PDA), a portable computer, a web tablet, a wireless phone, a mobile phone, a digital music player and a memory card, or all types of electronic products capable of transmitting or receiving information in a wireless environment.

The electronic system 1100 may include a host device that can transmit and receive the data to and from the memory card, using the memory card adapter according to the above-mentioned example embodiments of the present inventive concepts.

Figure 17:
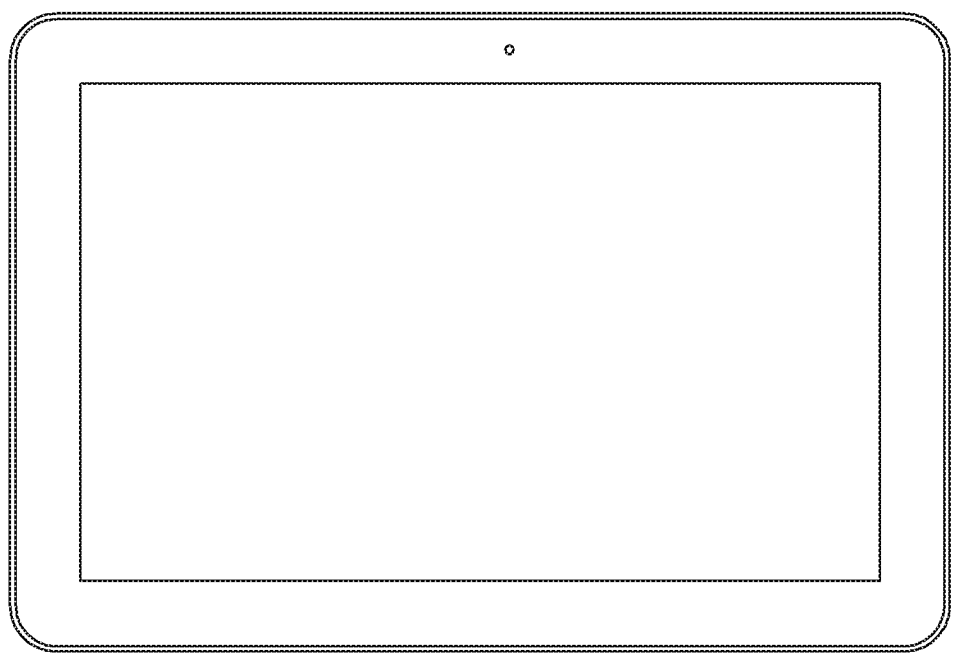
FIGS. 17 to 19 are example semiconductor systems to which the memory card adapter according to some example embodiments of the present inventive concepts and the memory card socket using the same are applicable.
Figure 18:
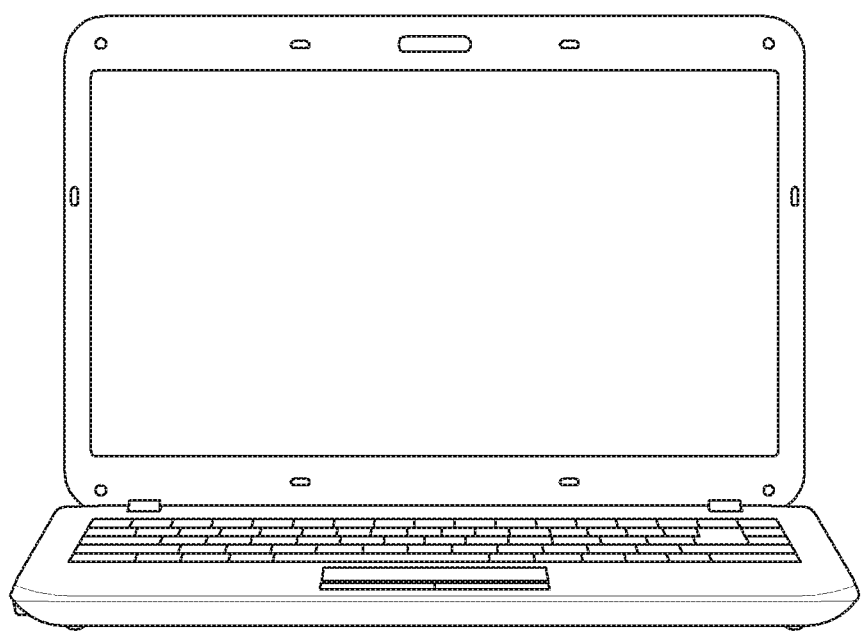
Figure 19:
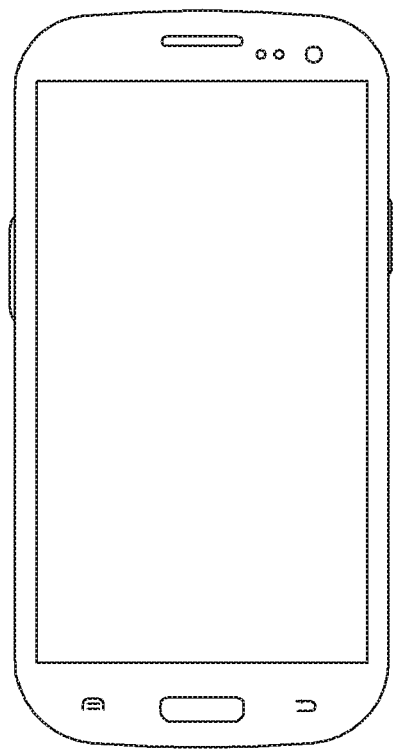

FIGS. 17 to 19 are example semiconductor systems to which the memory card adapter according to some example embodiments of the present inventive concepts, and the memory card socket using the same are applicable.

FIG. 17 illustrates a tablet personal computer (PC) 1200, FIG. 18 illustrates a laptop computer 1300, and FIG. 19 illustrates a smartphone 1400. At least one of the memory card adapter according to the example embodiments of the present inventive concepts and the memory card socket using the same may be used in the tablet PC 1200, the notebook computer 1300, and/or the smartphone 1400.

Further, it is obvious to those skilled in the art that the memory card adapter according to some example embodiments of the present inventive concepts and the memory card socket using the same may also be applied to other IC devices other than those set forth herein. That is, while only the tablet PC 120, the notebook computer 1300 and the smartphone 1400 have been described above as the application examples according to the example embodiment of the present inventive concepts, but application examples are not limited thereto. In some example embodiments of the present inventive concepts, the semiconductor system equipped with the memory card adapter and the memory card socket using the same may be provided as a computer, an ultra-mobile PC (UMPC), a work station, a net-book computer, a personal digital assistant (PDA), a portable computer, a wireless phone, a mobile phone, an e-book, a portable multimedia player (PMP), a portable game console, a navigation device, a black box, a digital camera, a 3-dimensional television set, a digital audio recorder, a digital audio player, a digital picture recorder, a digital picture player, a digital video recorder, a digital video player, etc.

While the present inventive concepts have been particularly illustrated and described with reference to some example embodiments thereof, it will be understood by those of ordinary skill in the art that various changes in form and detail may be made therein without departing from the spirit and scope of the present inventive concepts as defined by the following claims. The disclosed example embodiments should be considered in a descriptive sense only and not for purposes of limitation.

What is claimed is:

1. A memory card adapter comprising:
   a main housing section that corresponds to a memory card socket of a first standard, the main housing section including a card housing section, the card housing section configured to house a memory card of a second standard different from the first standard therein;
   a first surface of the main housing section defining a through-hole, the through-hole configured to expose a connection pin of the memory card to be housed in the card housing section to an outside of the card housing section; and
   a second surface of the main housing section defining a card insertion hole, the second surface being different from the first surface, the card insertion hole configured to receive the memory card into the card housing section.

2. The memory card adapter of claim 1, wherein the memory card is configured to operate using at least one of a universal flash storage (UFS) interface, an ultra-high speed class 1 (UHS-1) interface, and an ultra-high speed class 2 (UHS-2) interface.

3. The memory card adapter of claim 1, wherein the through-hole is configured to receive at least a portion of a connection pin of the memory card socket.

4. The memory card adapter of claim 3, wherein the connection pin of the memory card is configured to physically contact the connection pin of the memory card socket through the through-hole.

5. The memory card adapter of claim 1, wherein the first surface is an upper surface of the main housing section and the second surface is a side surface of the main housing section.

6. The memory card adapter of claim 5, wherein a distance between the upper surface of the main housing section and the card insertion hole is less than a distance between a lower surface of the main housing section and the card insertion hole.

7. The memory card adapter of claim 1, further comprising:
   a cover configured to open and close the card insertion hole and prevent release of the memory card housed in the card housing section.

8. The memory card adapter of claim 7, wherein the cover is a sliding cover that is configured to open and close the card insertion hole along the second surface in a sliding manner.

9. The memory card adapter of claim 8, wherein the main housing section comprises a sliding cover guide section that is configured to guide movement of the sliding cover.

10. The memory card adapter of claim 1, wherein the card housing section comprises an inclined portion, the inclined portion configured to obliquely house the memory card with respect to a lower surface of the main housing section.

11. The memory card adapter of claim 10, wherein a third surface of the card housing section, the third surface being opposite to the first surface, forms an acute angle with respect to the lower surface of the main housing section.

12. The memory card adapter of claim 1, wherein the main housing section comprises a recessed shape or a chamfered shape at a corner thereof.

13. A memory card adapter comprising:
   a main housing section that corresponds to a memory card socket of a first standard, the main housing section including a card housing section, the card housing section configured to house a memory card of a second standard different from the first standard therein;
   an upper surface of the main housing section defining a through-hole and a card insertion hole, the through-hole configured to expose a connection pin of the memory card therethrough; and the card insertion hole configured to receive the memory card into the card housing section.

14. The memory card adapter of claim 13, wherein the main housing section comprises a card insertion guide section configured to guide the memory card, which is received through the card insertion hole, into the card housing section in a sliding manner.

15. The memory card adapter of claim 14, wherein the card insertion guide section has an inclined shape that allows the memory card, which is received through the card insertion hole, to be obliquely inserted into the card housing section.

16. A memory card adapter being compliant with a memory card socket having a first form factor, the memory card adapter comprising:
- a card housing section configured to house a memory card, the memory card having a second form factor, the second form factor smaller than the first form factor, the memory card including a card connection pin, the card connection pin compliant with a first standard;
- a first surface of the memory card adapter defining a card insertion hole, the card insertion hole configured to receive the memory card into the card housing section; and
- a second surface of the memory card adapter defining a through-hole, the through-hole exposing the card connection pin of the memory card.

17. The memory card adapter of claim 16, wherein the memory card adapter includes an insulating portion at a location, the location corresponding to a location for a connection pin compliant with a second standard.

18. The memory card adapter of claim 17, wherein the insulating portion is at the second surface and is spaced apart from the through-hole.

19. The memory card adapter of claim 18, wherein the insulating portion includes an insulating coating film.

20. The memory card adapter of claim 17, wherein the insulating portion includes a chamfered portion or a recessed portion at the location.

* * * * *